US012410909B2

(12) United States Patent
Lambesis et al.

(10) Patent No.: US 12,410,909 B2
(45) **Date of Patent: *Sep. 9, 2025**

(54) MODULAR LIGHTING SYSTEM ASSEMBLY

(71) Applicant: Pinnacle 20, LLC, Phoenix, AZ (US)

(72) Inventors: Nikos Aristotle Lambesis, Cave Creek, AZ (US); Kevin Lambesis, Cave Creek, AZ (US)

(73) Assignee: Pinnacle 20, LLC, Phoenix, AZ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/736,311

(22) Filed: Jun. 6, 2024

(65) Prior Publication Data

US 2024/0318813 A1 Sep. 26, 2024

Related U.S. Application Data

(63) Continuation of application No. 17/960,721, filed on Oct. 5, 2022, now Pat. No. 12,031,706.

(51) Int. Cl.

*F21V 23/06* (2006.01)
*F21S 2/00* (2016.01)
*F21Y 115/10* (2016.01)

(52) U.S. Cl.

CPC .............. *F21V 23/06* (2013.01); *F21S 2/005* (2013.01); *F21Y 2115/10* (2016.08)

(58) Field of Classification Search

CPC ........ F21V 23/06; F21V 23/001; F21S 2/005; F21S 8/061; F21Y 2115/10

See application file for complete search history.

(56) References Cited

U.S. PATENT DOCUMENTS 4,668,845 A 5/1987 Izumi
4,784,356 A * 11/1988 Fox ......................... B61L 29/04 248/228.6
7,494,244 B1 * 2/2009 Van Diep .............. F21V 19/001 439/502
9,093,188 B1 7/2015 Holland
9,097,417 B1 8/2015 Kwon
9,726,332 B1 * 8/2017 May ......................... F21S 8/061
12,031,706 B1 * 7/2024 Lambesis .............. F21V 23/001
2003/0222588 A1 12/2003 Myron
2007/0091596 A1 4/2007 Grossman
2007/0262725 A1 11/2007 Koren
2008/0248673 A1 10/2008 Boehnlein
2010/0204841 A1 8/2010 Chemel (Continued)

*Primary Examiner* — Evan P Dzierzynski

(74) *Attorney, Agent, or Firm* — Pacer K. Udall; Booth Udall, PLC

(57) ABSTRACT

A modular lighting system includes a base that includes three cable connectors, a first cable connected to a first cable connector and connecting the base to a first adjacent base, a second cable connected to a second cable connector and connecting the base to a second adjacent base, a third cable connected to a third cable connector and connecting the base to a lighting unit, and the lighting unit. The first adjacent base is disposed upstream from the base, and the second adjacent base is disposed downstream from the base. The first, second, and third cables are interchangeable such that they can connect to any of the three cable connectors. Power transmitted along the third cable is less than power transmitted along the first cable and than power transmitted along the second cable.

11 Claims, 5 Drawing Sheets

(56) References Cited

U.S. PATENT DOCUMENTS

| | | | | |
|---|---|---|---|---|
| 2012/0098446 | A1 | 4/2012 | Kim | |
| 2012/0212048 | A1* | 8/2012 | D' Ascanio | H02G 9/02 307/11 |
| 2012/0261988 | A1* | 10/2012 | Byrne | H01R 13/6616 307/112 |
| 2015/0362156 | A1 | 12/2015 | Chien | |
| 2016/0122208 | A1 | 5/2016 | Denkewicz | |
| 2016/0227629 | A1 | 8/2016 | Conner | |
| 2018/0202636 | A1 | 7/2018 | Fox | |
| 2020/0137859 | A1 | 4/2020 | Yan | |

* cited by examiner

MODULAR LIGHTING SYSTEM ASSEMBLY

RELATED APPLICATIONS

This application is a continuation of U.S. non-provisional patent application Ser. No. 17/960,721, filed Oct. 5, 2022 to Nikos Aristotle LAMBESIS et al., titled "MODULAR LIGHTING SYSTEM ASSEMBLY," the entirety of the disclosure of which is hereby incorporated by this reference.

TECHNICAL FIELD

Aspects of this document relate generally to modular lighting systems and more specifically to improving power supply to lights farther from the main power source.

BACKGROUND

Both outdoor spaces (such as backyards, walkways, and patios) and indoor spaces (such as restaurants, clubs, and other venues) can often be enhanced by increasing the beauty, appeal, and utility of the spaces with the addition of elements such as lighting. Some conventional lighting systems provide a range of colors and intensities, allowing for the creation of a lighting setup tailored to a particular space or a particular function or activity, such as a party. However, bespoke conventional lighting systems can be very expensive, requiring careful installation and wiring. Such systems, though expensive and custom made, often lack features such as individually addressable lights. Once installed, rearranging the lighting units can be time consuming and expensive, sometimes requiring replacement of a portion of the system. While less expensive conventional lighting systems exist, they have their own set of drawbacks. The cost of such systems is low because they can be mass produced, with lights spaced evenly along a line, such as every two feet. Such a constraint can make such systems difficult to adapt to locations needing variable spacing between the lights.

In addition, even where a modular lighting system is used, there may be some limits to the design. For example, modular systems may face difficulties in providing enough power to lights farther down a line of the lighting system away from the main power source. Thus, modular lighting systems that improve power supply to lights farther away from a power source are desirable.

SUMMARY

Aspects of this document relate to a modular lighting system. These aspects may comprise, and implementations may include, one or more or all of the components and steps set forth in the appended CLAIMS.

In one aspect, a modular lighting system includes a base that has three cable connectors, a first cable connected to a first cable connector of the three cable connectors, a second cable connected to a second cable connector of the three cable connectors, a third cable connected to a third cable connector of the three cable connectors, and a lighting unit. In some embodiments, the first cable connects the base to a first adjacent base in a series of bases, with the first adjacent base being disposed upstream from the base. In some embodiments, the second cable connects the base to a second adjacent base in the series of bases, with the second adjacent base being disposed downstream from the base. In some embodiments, the third cable connects the base to the lighting unit. In some embodiments, the first cable, the second cable, and the third cable are interchangeable such that the first cable, the second cable, and the third cable can connect to any of the first cable connector, the second cable connector, and the third cable connector. In some embodiments, a power transmitted along the third cable from the base to the lighting unit is less than a power transmitted along the first cable from the first adjacent base to the base. In some embodiments, the power transmitted along the third cable is less than a power transmitted along the second cable from the base to the second adjacent base.

In some embodiments, the first cable connector and the second cable connector are disposed on opposite sides of the base from each other. In some embodiments, the third cable connector is disposed at a 90-degree angle with respect to the first cable connector and the second cable connector. In some embodiments, the third cable connector is disposed on a bottom of the base. In some embodiments, the lighting unit is disposed below the base. In some embodiments, the base is a T-shaped connection. In some embodiments, the lighting unit includes one or more light emitting diodes.

In one aspect, a modular lighting system includes a base that includes three cable connectors, a base circuit board, and a microcontroller mounted on the base circuit board. In some embodiments, the system includes a first cable connected to a first cable connector of the three cable connectors, a second cable connected to a second cable connector of the three cable connectors, a third cable connected to a third cable connector of the three cable connectors, and a lighting unit that includes a lighting unit circuit board and one or more light emitting diodes mounted on the lighting unit circuit board. In some embodiments, the first cable connects the base to a first adjacent base in a series of bases, with the first adjacent base being disposed upstream from the base. In some embodiments, the second cable connects the base to a second adjacent base in the series of bases, with the second adjacent base being disposed downstream from the base. In some embodiments, the third cable connects the base to the lighting unit.

In some embodiments, the microcontroller mounted on the base circuit board controls the light emitting diodes mounted on the lighting unit circuit board. In some embodiments, an amount of power transmitted along the third cable is less than an amount of power transmitted along the first cable and an amount of power transmitted along the second cable. In some embodiments, the first cable connector and the second cable connector are disposed on opposite sides of the base from each other. In some embodiments, the third cable connector is disposed at a 90-degree angle with respect to the first cable connector and the second cable connector. In some embodiments, the third cable connector is disposed on a bottom of the base. In some embodiments, the lighting unit is disposed below the base.

In one aspect, a modular lighting system includes a control unit, a plurality of bases arranged in series, with a first base of the plurality of bases being connected to the control unit, a plurality of lighting units, with each lighting unit being connected to one of the plurality of bases, and a plurality of cables including a first cable connecting the control unit and the first base of the plurality of bases, a set of base cables, with each base cable connecting two bases of the plurality of bases, and a set of lighting unit cables, with each lighting unit cable connecting one of the plurality of lighting units to one of the plurality of bases. In some embodiments, the first cable, the base cables, and the lighting unit cables are interchangeable.

In some embodiments, the first cable, the base cables, and the lighting unit cables include cables of different lengths. In some embodiments, the base cables include cables of different lengths. In some embodiments, the lighting unit cables include cables of different lengths. In some embodiments, an amount of power transmitted along the lighting unit cables is less than an amount of power transmitted along the first cable and the base cables. In some embodiments, each of the plurality of lighting units is disposed below the base to which the lighting unit is connected.

In one aspect, a modular lighting system includes a control unit, a plurality of bases arranged in series, with a first base of the plurality of bases being connected to the control unit, a plurality of lighting units, with each lighting unit being connected to one of the plurality of bases, and a plurality of cables including a first cable connecting the control unit and the first base of the plurality of bases, a set of base cables, with each base cable connecting two bases of the plurality of bases, and a set of lighting unit cables, with each lighting unit cable connecting one of the plurality of lighting units to one of the plurality of bases.

In some embodiments, the first cable and the base cables are interchangeable. In some embodiments, the lighting unit cables are different than the first cable and the base cables such that the lighting unit cables are not interchangeable with the first cable or the base cables. In some embodiments, the lighting unit cables are stiffer than the first cable and the base cables. In some embodiments, a diameter of the lighting unit cables is different than a diameter of the first cable and a diameter of the base cables. In some embodiments, the diameter of the lighting unit cables is less than the diameter of the first cable and the diameter of the base cables. In some embodiments, an amount of power transmitted along the lighting unit cables is less than an amount of power transmitted along the first cable and the base cables. In some embodiments, each base includes a base circuit board and a microcontroller mounted on the base circuit board. In some embodiments, each lighting unit includes a lighting unit circuit board and one or more light emitting diodes mounted on the lighting unit circuit board.

The foregoing and other aspects, features, and advantages will be apparent to those artisans of ordinary skill in the art from the DESCRIPTION and DRAWINGS, and from the CLAIMS.

Unless specifically noted, it is intended that the words and phrases in the specification and the claims be given their plain, ordinary, and accustomed meaning to those of ordinary skill in the applicable arts. The inventors are fully aware that they can be their own lexicographers if desired. The inventors expressly elect, as their own lexicographers, to use only the plain and ordinary meaning of terms in the specification and claims unless they clearly state otherwise and then further, expressly set forth the "special" definition of that term and explain how it differs from the plain and ordinary meaning. Absent such clear statements of intent to apply a "special" definition, it is the inventors' intent and desire that the simple, plain and ordinary meaning to the terms be applied to the interpretation of the specification and claims.

The inventors are also aware of the normal precepts of English grammar. Thus, if a noun, term, or phrase is intended to be further characterized, specified, or narrowed in some way, then such noun, term, or phrase will expressly include additional adjectives, descriptive terms, or other modifiers in accordance with the normal precepts of English grammar. Absent the use of such adjectives, descriptive terms, or modifiers, it is the intent that such nouns, terms, or phrases be given their plain, and ordinary English meaning to those skilled in the applicable arts as set forth above.

Further, the inventors are fully informed of the standards and application of the special provisions of 35 U.S.C. § 112(f). Thus, the use of the words "function," "means" or "step" in the Detailed Description or Description of the Drawings or claims is not intended to somehow indicate a desire to invoke the special provisions of 35 U.S.C. § 112(f), to define the invention. To the contrary, if the provisions of 35 U.S.C. § 112(f) are sought to be invoked to define the inventions, the claims will specifically and expressly state the exact phrases "means for" or "step for", and will also recite the word "function" (i.e., will state "means for performing the function of [insert function]"), without also reciting in such phrases any structure, material or act in support of the function. Thus, even when the claims recite a "means for performing the function of . . . " or "step for performing the function of . . . ," if the claims also recite any structure, material or acts in support of that means or step, or that perform the recited function, then it is the clear intention of the inventors not to invoke the provisions of 35 U.S.C. § 112(f). Moreover, even if the provisions of 35 U.S.C. § 112(f) are invoked to define the claimed aspects, it is intended that these aspects not be limited only to the specific structure, material or acts that are described in the preferred embodiments, but in addition, include any and all structures, materials or acts that perform the claimed function as described in alternative embodiments or forms of the disclosure, or that are well known present or later-developed, equivalent structures, material or acts for performing the claimed function.

BRIEF DESCRIPTION OF THE DRAWINGS

The disclosure will hereinafter be described in conjunction with the appended drawings, where like designations denote like elements, and.

DETAILED DESCRIPTION

Figure 1:
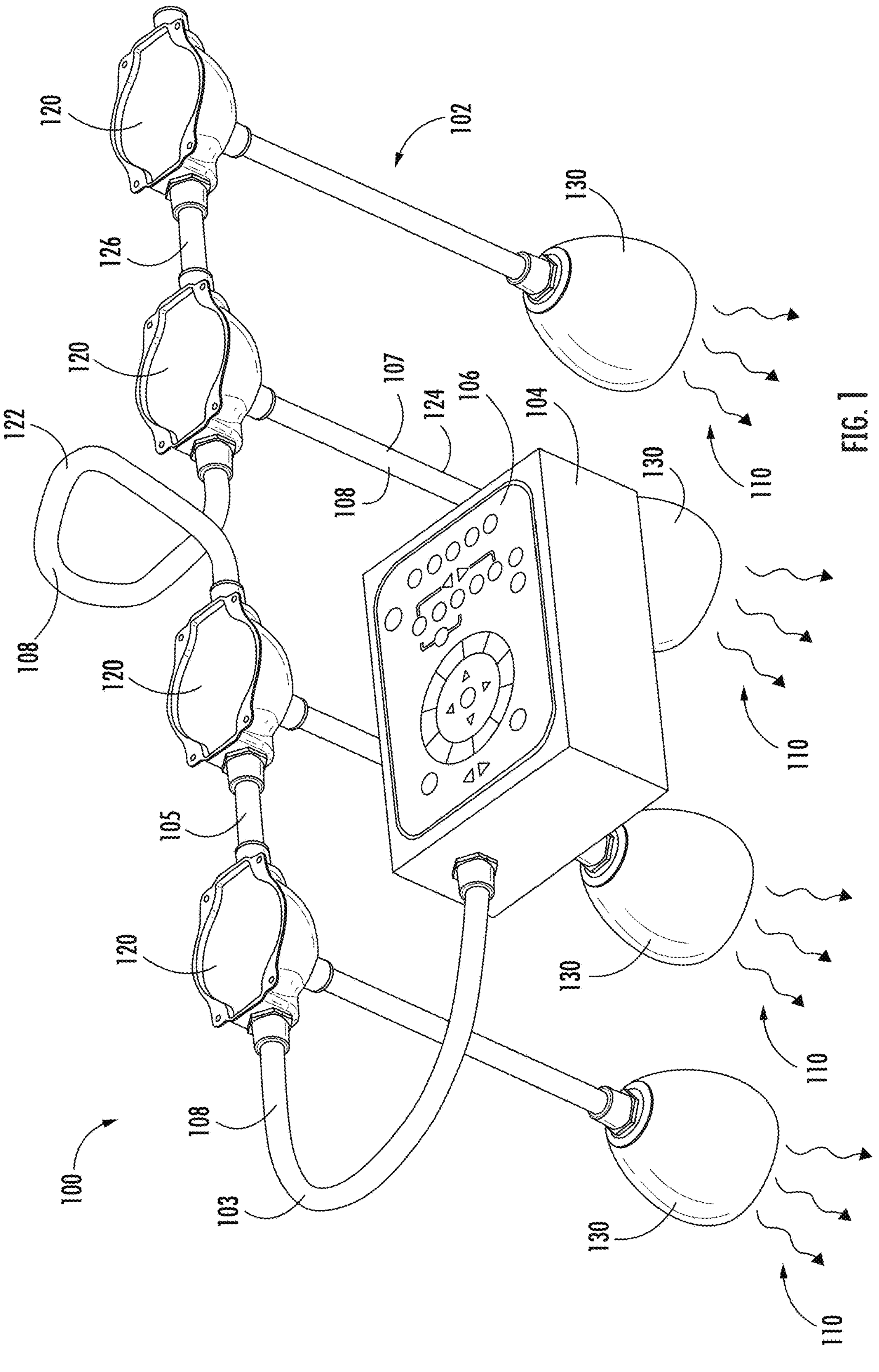
FIG. 1 is a perspective view of a modular lighting system according to some embodiments.

This disclosure, its aspects and implementations, are not limited to the specific material types, components, methods, or other examples disclosed herein. Many additional material types, components, methods, and procedures known in the art are contemplated for use with particular implementations from this disclosure. Accordingly, for example, although particular implementations are disclosed, such implementations and implementing components may comprise any components, models, types, materials, versions, quantities, and/or the like as is known in the art for such systems and implementing components, consistent with the intended operation.

The word "exemplary," "example," or various forms thereof are used herein to mean serving as an example, instance, or illustration. Any aspect or design described herein as "exemplary" or as an "example" is not necessarily to be construed as preferred or advantageous over other aspects or designs. Furthermore, examples are provided solely for purposes of clarity and understanding and are not meant to limit or restrict the disclosed subject matter or relevant portions of this disclosure in any manner. It is to be appreciated that a myriad of additional or alternate examples of varying scope could have been presented but have been omitted for purposes of brevity.

While this disclosure includes a number of embodiments in many different forms, there is shown in the drawings and will herein be described in detail particular embodiments with the understanding that the present disclosure is to be considered as an exemplification of the principles of the disclosed methods and systems and is not intended to limit the broad aspect of the disclosed concepts to the embodiments illustrated.

Both outdoor spaces (such as backyards, walkways, and patios) and indoor spaces (such as restaurants, clubs, and other venues) can often be enhanced by increasing the beauty, appeal, and utility of the spaces with the addition of elements such as lighting. Some conventional lighting systems provide a range of colors and intensities, allowing for the creation of a lighting setup tailored to a particular space or a particular function or activity, such as a party. However, bespoke conventional lighting systems can be very expensive, requiring careful installation and wiring. Such systems, though expensive and custom made, often lack features such as individually addressable lights. Once installed, rearranging the lighting units can be time consuming and expensive, sometimes requiring replacement of a portion of the system. While less expensive conventional lighting systems exist, they have their own set of drawbacks. The cost of such systems is low because they can be mass produced, with lights spaced evenly along a line, such as every two feet. Such a constraint can make such systems difficult to adapt to locations needing variable spacing between the lights.

In addition, even where a modular lighting system is used, there may be some limits to the design. For example, modular systems may face difficulties in providing enough power to lights farther down a line of the lighting system away from the main power source. Thus, modular lighting systems that improve power supply to lights farther away from a power source are desirable, thus providing more flexibility in the design of the modular system.

For example, it may be desirable to use lights that hang from a ceiling in an indoor space or to use lights that are low to, but spaced from, the ground in an outdoor space. Running power along cables in such a system may use up too much power so that the lights farther from the power source do not have enough power. Contemplated herein is a lighting system that improves power supply for lights farther from the power source, while maintaining modularity such that lighting units are able to be rearranged at will and deployed in any desired configuration. In some embodiments, the contemplated modular lighting system comprises a control unit, a plurality of cables, a plurality of lighting units, and a base associated with each lighting unit. The cables may connect the control unit with a first base, adjacent bases to each other, and bases with their respective lighting units. In some embodiments, the cables are interchangeable with each other. In some embodiments, at least one of the cables is not interchangeable with other cables. For example, in some embodiments, cables connecting lighting units to bases may not be interchangeable with cable connecting the control unit with a base and cables connecting adjacent bases to each other.

In some embodiments, less power is transmitted along the cables connecting a base with a lighting unit than the cables connecting adjacent bases. Each base may comprise a circuit board with a controller mounted on the circuit board. Each lighting unit may comprise a circuit board with one or more light-emitting diodes mounted on the circuit board. By using two circuit boards, with one at the base and one at the lighting unit, less power may be transmitted along the cables connecting a base with a lighting unit to provide power to the lighting unit. This shortens the distance of cable along which full power is being transmitted, thus improving the power supply to lights farther away from the power source. The modular lighting systems disclosed herein may use any of the features disclosed in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022. The disclosures of these three applications are hereby incorporated by reference in their entireties into this disclosure.

A modular lighting system is shown, for example, in FIG. 1 as modular lighting system 100. In some embodiments, modular lighting system 100 comprises one or more spaced lighting arrangements 102 (each including a base 120, a lighting unit 130, and a cable 108 connecting the base 120 to the lighting unit 130), a control unit 104, and a plurality of cables 108 connecting the control unit 104 and the one or more spaced lighting arrangements 102. The one or more spaced lighting arrangements 102 are arranged in series.

In some embodiments, control unit 104 is configured to control lighting units 130 of spaced lighting arrangements 102. The control unit 104 may provide power and instructions to spaced lighting arrangements 102, causing lighting units 130 to emit light 110. In some embodiments, control unit 104 comprises a user interface 106. User interface 106 may allow a user to perform various operations with respect to modular lighting system 100, such as turning the modular lighting system 100 on and off, selecting a mode for modular lighting system 100 (e.g., selecting a color of light emitted, selecting a pattern of how light is emitted, etc.), dimming the lights, and performing other operations. In some embodiments, control unit 104 and/or user interface 106 may have any of the features of the control units and user interfaces described in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022.

In some embodiments, cables 108 convey the power and instructions from control unit 104 to the spaced lighting arrangements 102. Cables 108 may be provided in a variety of lengths so that different arrangements of system 100 may be made depending on the space in which lighting system 100 is being installed. The ends of each cable 108 may be configured to connect with control unit 104, bases 120, or lighting units 130. For example, ends of cables 108 may be provided with threads to mate with cable connectors on the control unit 104, bases 120, and lighting units 130. Other types of attachments may alternatively be used instead of threads. In some embodiments, the ends of cable 108 are identical to each other so that the orientation of cable 108 is not important, which may facilitate quicker assembly of system 100. Cables 108 may include any of the features of the cables described in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022.

The reference numeral 108 is used generally to refer to any cable 108 used in system 100. Other reference numerals are also used to refer to various cables to specify which cable is being referred to. For example, a cable 108 between control unit 104 and a first base 120 may be referred to as a cable 103, a cable 108 between two bases 120 may be referred to as a cable 105, and a cable 108 between a base 120 and a lighting unit 130 may be referred to as a cable 107. As another example, in discussing a spaced lighting arrangement 102 and its adjacent cables 108, a cable 108 connecting the base 120 of that spaced lighting arrangement 102 and an adjacent base 120 upstream from that spaced lighting arrangement 102 (i.e., closer to control unit 104) may be referred to as a cable 122, a cable 108 connecting the base 120 to the lighting unit 130 of that spaced lighting arrangement 102 may be referred to as a cable 124, and a cable 108 connecting the base 120 of that spaced lighting arrangement 102 and an adjacent base 120 downstream from that spaced lighting arrangement 102 (i.e., farther away from control unit 104) may be referred to as a cable 126.

It should be understood, however, that these other reference numerals are just for convenience in describing system 100. In some embodiments, cables 108 are interchangeable such that any cable 108 may be used to connect any two components to allow for modularity of system 100. Thus, the other reference numerals for cables 108 (e.g., 103, 105, 107, 122, 124, 126) designate a location of a cable 108 with respect to other components in system 100 and not necessarily a difference in structure. For example, a cable 108 may be arranged between a control unit 104 and the first base 120 (i.e., be a cable 103) in one arrangement and subsequently be arranged between two bases 120 (i.e., be a cable 105) or between a base 120 and a lighting unit 130 (i.e., be a cable 107) in another arrangement. Even in one arrangement, a cable 108 may be a cable 126 with respect to one base 120 (i.e., be disposed downstream to connect to an adjacent base 120) and be a cable 122 with respect to that adjacent base 120 (i.e., be disposed upstream from that adjacent base 120).

In some embodiments, not all cables 108 are interchangeable. For example, in some embodiments, cable 103 and cables 105 may be interchangeable while cables 107 between a lighting unit 130 and a base 120 are not interchangeable with cable 103 or cables 105. In some embodiments, cables 107 are different than the first cable and the base cables such that the lighting unit cables are not interchangeable with the first cable or the base cables. For example, cables 107 may be stiffer than cable 103 and cables 105. As another example, a diameter of the cables 107 may be different than a diameter of the cable 103 and a diameter of cables 105. In some embodiments, the diameter of the cables 107 may be less than the diameter of cable 103 and the diameter of cables 105. In some embodiments, this difference may be for aesthetic reasons, such as to provide a sleek design for the cables 107 extending down to lighting units 130. In some embodiments, this difference may be due to a difference in requirements for the cables. For example, cables 107 may have fewer wires (e.g., two or three wires) than the number of wires in cable 103 and cables 105 (e.g., five or six wires) because less communication and less power is required to be transmitted from bases 120 to lighting units 130 when compared to communication and power being transmitted from control unit 104 to bases 120 and from one base 120 to another base 120. Other examples of cables 108 not being interchangeable are possible in other embodiments.

In some embodiments, spaced lighting arrangement 102 comprises a base 120, a lighting unit 130, and a cable 108 connecting the base 120 to the lighting unit 130 (i.e., a cable 107 or 124). Lighting unit 130 is configured to emit light 110 when system 100 is powered and running (depending on instructions from control unit 104). Additional details about spaced lighting arrangements (such as lighting arrangement 102) are provided below with respect to FIGS. 2-5. In some embodiments, lighting unit 130 (or base 120) may have any of the features of the lighting units described in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022.

As illustrated in FIG. 1, modular lighting system 100 includes, in some embodiments, control unit 104, a plurality of bases 120 arranged in series (with a first base 120 connected to control unit 104), a plurality of lighting units 130, and a plurality of cables 108. In some embodiments, each lighting unit 130 is connected to one of the plurality of bases 120. The plurality of cables 108 may include a first cable 103 connecting the control unit 104 and the first base 120, a set of base cables 105, and a set of lighting unit cables 107. Each base cable 105 connects two bases 120 to each other. Each lighting unit cable 107 connects one of the lighting units 130 to one of the bases 120. In some embodiments, the first cable 103, the base cables 105, and the lighting unit cables 107 are interchangeable. Thus, as noted above, the designation as the first cable 103, a base cable 105, and a lighting unit cable 107 indicates the arrangement of those cables 108 rather than necessarily a structural difference (e.g., first cable 103 may subsequently be a base cable 105 or a lighting unit cable 107 in a different arrangement of system 100).

In some embodiments, first cable 103, base cables 105, and lighting unit cables 107 include cables of different lengths. For example, at least one of these cables 103, 105, 107 may have a different length than another one of the cables 103, 105, 107. In some embodiments, each cable 103, 105, 107 may have a unique length, different from any other cable 103, 105, 107. In other embodiments, each cable 103, 105, 107 has the same length. In some embodiments, cable 103 may have a different length than cables 105 (which may all have the same length), and cables 107 (which may all have the same length) may have a different length than cable 103 and cables 105.

In some embodiments, base cables 105 include cables of different lengths. For example, at least one of base cables 105 may have a different length than another one of base cables 105. In some embodiments, each base cable 105 may have a unique length, different from any other base cable 105. In other embodiments, each base cable 105 has the same length. In some embodiments, lighting unit cables 107 include cables of different lengths. For example, at least one of lighting unit cables 107 may have a different length than another one of lighting unit cables 107. In some embodiments, each lighting unit cable 107 may have a unique length, different from any other lighting unit cable 107. In other embodiment, each lighting unit cable 107 has the same length. In some embodiments, an amount of power transmitted along the lighting unit cables 107 is less than an amount of power transmitted along the first cable 103 and the base cables 105. As discussed in more detail below, sending less power along lighting unit cables 107 may help supply power to lighting units 130 that are farther away from the power source (e.g., control unit 104).

In some embodiments, as shown in FIG. 1, the lighting units 130 are disposed below bases 120 (i.e., lighting units 130 are arranged such that they are closer to a ground surface or floor than their respective bases 120). For example, each lighting unit 130 in FIG. 1 is disposed below the base 120 to which the lighting unit 130 is connected. This arrangement may be used, for example, when the lighting units 130 are spaced from the ceiling. For example, bases 120 may be connected to the ceiling and lighting units 130 may be disposed below the bases 120 (e.g., hanging by lighting unit cable 107). In some embodiments, as discussed below and shown in FIGS. 4 and 5, lighting units 130 may be disposed above the bases 120 (i.e., lighting units 130 are arranged such that they are farther away from a ground surface or floor than their respective bases 120). This arrangement may be used, for example, when the lighting units 130 are spaced from the ground. For example, bases 120 may be connected to, placed on, or inserted into the ground and lighting units 130 may be disposed above the bases 120.

Modular lighting system 100 is illustrated in FIG. 1 to show various components of system 100 and how they fit together. The illustrated system 100 is, however, merely representative and does not limit how the system 100 may be arranged. For example, although four lighting units 130 are shown, more or fewer lighting units 130 may be used as part of system 100. Because lighting system 100 is modular, any number of variations may be made to how the system 100 is arranged to fit a specific indoor or outer space. These variations may include, but are not limited to, the length of the cable 103 between the control unit 104 and the first base 120, the lengths of the cables 105 between bases 120 (which may all be the same length, all be different lengths, or be a mixture of being the same and different lengths), the lengths of the cables 107 between each base 120 and its respective lighting unit 130 (which may all be the same length, all be different lengths, or be a mixture of being the same and different lengths), and the number of bases 120 and lighting units 130.

Thus, a user may assemble the system 100 to fit a particular space by selecting where to place the control unit 104, selecting where to place the lighting units 130 within the space (e.g., exact locations where lighting units 130 are desired, how far to space each lighting unit 130 from adjacent lighting units 130, how far to space each lighting unit 130 from the ceiling or ground, etc.), selecting cables 108 of appropriate lengths so that each lighting unit 130 is in its desired location, and then assembling the components and installing the components in the space. Assembling the components and installing the components in the space may be done in any order. For example, the bases 120 and control unit 104 may be installed first and then all cables 108 and lighting units 130 attached. As another example, the entire system 100 may be assembled first and then installed in the space. As yet another example, the system 100 may be assembled and installed in parallel (e.g., the control unit 104 is installed, a cable 103 is attached to the control unit 104, a base 120 is attached to the other end of cable 103, the base 120 is installed (e.g., coupled to the ceiling or installed in the ground), a cable 107 is attached to the base 120, a lighting unit 130 is attached to the other end of cable 107, a cable 105 is attached to the base 120, another base 120 is attached to the other end of cable 105, etc.). Other variations in assembling and installing the system 100 may also be used.

Figure 2:
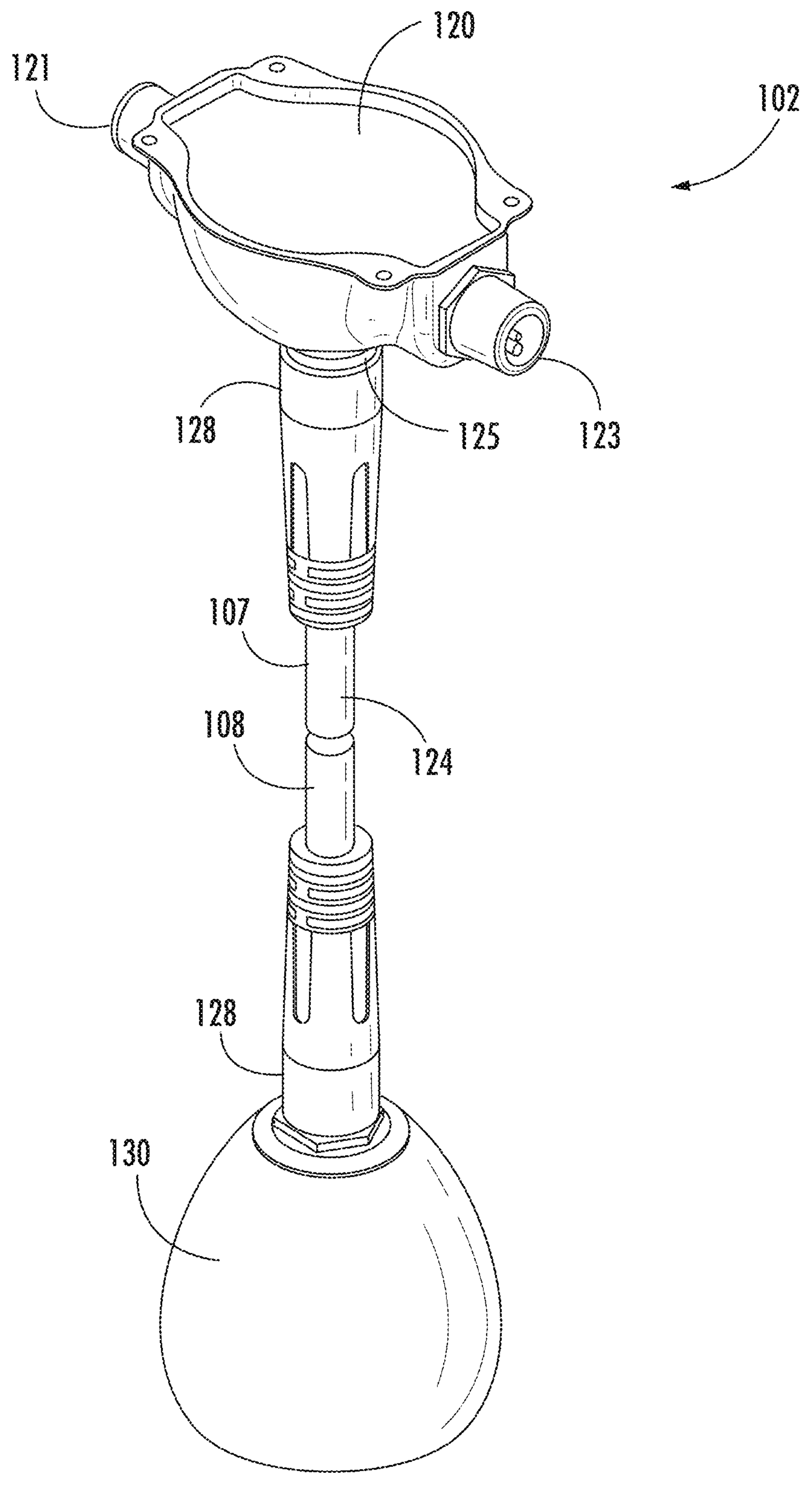
FIG. 2 is a perspective view of a base, a cable, and a lighting unit that may be used in a modular lighting system according to some embodiments.
Figure 3:
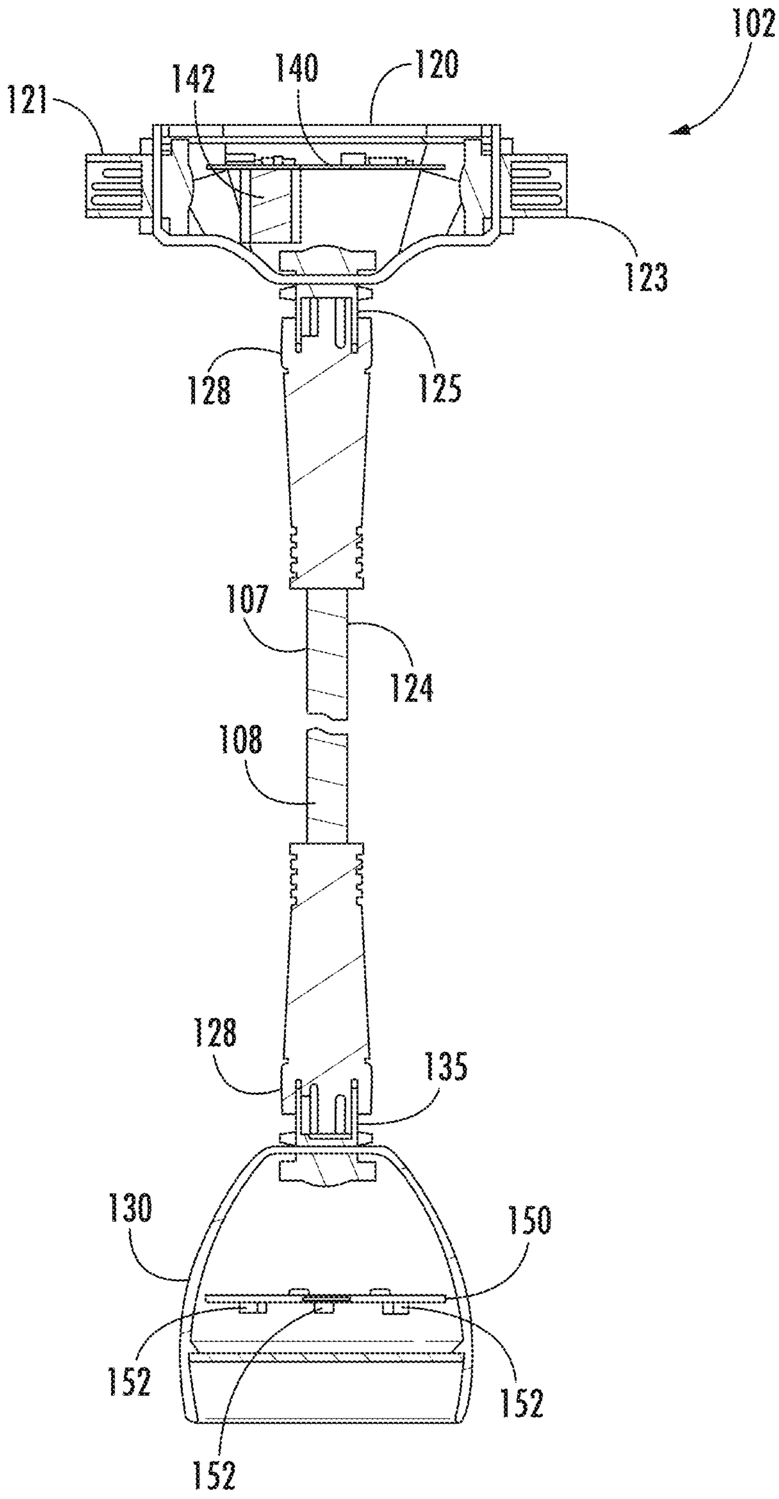
FIG. 3 is a cross-section view of the base, cable, and lighting unit of FIG. 2 according to some embodiments.

An example of spaced lighting arrangement 102 (comprising base 120, lighting unit 130, and cable 108 connecting the base 120 and the lighting unit 130) is shown in more detail in FIGS. 2 and 3. In some embodiments, base 120 comprises three cable connectors, including a first cable connector 121, a second cable connector 123, and a third cable connector 125. Each cable connector 121, 123, 125 is configured to connect to a cable 108. For example, cable connectors 121, 123, 125 may be threaded or have some other mating feature corresponding to an end of cables 108. Cable connectors 121, 123, 125 may have any of the features of the cable connectors disclosed in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022.

In some embodiments, a first cable 122 is connected to first cable connector 121 (see FIG. 1 for the cable 122 and FIGS. 2 and 3 for the cable connector 121). First cable 122 may connect base 120 to a first adjacent base 120 disposed upstream in a series of bases 120. In some embodiments, a second cable 126 is connected to second cable connector 123 (see FIG. 1 for the cable 126 and FIGS. 2 and 3 for the cable connector 123). Second cable 126 may connect base 120 to a second adjacent base 120 disposed downstream in a series of bases 120. In some embodiments, a third cable 124 is connected to third cable connector 125 (see FIGS. 1-3 for the cable 124 and FIGS. 2 and 3 for the cable connector 125). Third cable 124 may connect base 120 to lighting unit 130. As discussed above, cables 122, 124, 126, in some embodiments, are interchangeable such that they are configured to connect to any of first cable connector 121, second cable connector 123, and third cable connector 125. In some embodiments, cable 124 may not be interchangeable with cables 122 or 126, as discussed above with respect to cable 107 and cables 103 and 105.

In some embodiments, first cable connector 121 and second cable connector 123 are disposed on opposite sides of base 120 from each other, as shown in FIG. 2. First cable connector 121 and second cable connector 123 may be aligned with each other such that they share a common axis. In other embodiments, first cable connector 121 and second cable connector 123 are disposed at angles with respect to each other. For example, first cable connector 121 and second cable connector 123 may be disposed at right angles to each other (i.e., 90-degree angles), which may facilitate a change in direction for a string of spaced lighting arrangements 102. In some embodiments, base 120 may have additional cable connectors, allowing a user to select which cable connector to use when assembling system 100.

In some embodiments, third cable connector 125 is disposed at a right angle (i.e., 90-degree angle) with respect to first cable connector 121 and second cable connector 123. First cable connector 121, second cable connector 123, and third cable connector 125 may have their axes in a single plane. In some embodiments, third cable connector 125 is disposed on a bottom of the base 120 (e.g., the portion of the base disposed closest to the ground or floor and farthest from the ceiling), as shown in FIG. 2. Lighting unit 130 may be disposed below base 120. With the first cable connector 121, second cable connector 123, and third cable connector 125 arranged as shown in FIGS. 2 and 3, base 120 may be a T-shaped connection between cables 122, 124, 126.

In some embodiments, cable 108 (which may also be referred to as cable 107 or cable 124) that connects lighting unit 130 to base 120 (via third cable connector 125) comprises two ends 128. One end 128 is connected to third cable connector 125 and the other end 128 is connected to a cable connector 135 (see FIG. 3) of lighting unit 130. Ends 128 may be the same, allowing cable 108 to be installed in either direction, furthering the modular nature of system 100. Ends 128 may include threads or some other mating feature to correspond with cable connectors 125 and 135 (and other cable connectors of system 100). To facilitate this, cable connectors 121, 123, 125, 135 may each have the same shape and size. A gap is shown in cable 108 to represent that cables 108 of different lengths may be used as the cable 124 that connects a base 120 and a lighting unit 130.

As shown in FIG. 3, base 120 may comprise a base circuit board 140. In some embodiments, base circuit board 140 is disposed within base 120 (e.g., within a housing of base 120). Base 120 may provide electrical connections between cable connectors 121, 123, 125 and base circuit board 140 so that power and communications from control unit 104 will reach base circuit board 140 and be able to be transmitted on to either lighting unit 130 or the next base 120. In some embodiments, a microcontroller 142 is mounted on base circuit board 140.

As also shown in FIG. 3, lighting unit 130 may comprise a lighting unit circuit board 150. In some embodiments, lighting unit circuit board 150 is disposed within lighting unit 130 (e.g., within a housing of lighting unit 130). Lighting unit 130 may provide electrical connections between cable connector 135 and lighting unit circuit board 150 so that power will reach lighting unit circuit board 150. In some embodiments, one or more light emitting diodes 152 are mounted on lighting unit circuit board 150.

Microcontroller 142 may be configured to control light emitting diodes 152. For example, microcontroller 142 may receive communication from control unit 104 and, based on that communication, light up light emitting diodes 152 so that lighting unit 130 emits light according to the communication from control unit 104. By placing microcontroller 142 in base 120 (rather than in lighting unit 130), less power can be transmitted along cable 124 than is transmitted along cables 122, 126. For example, power to light up the light emitting diodes 152 is all that is needed. Additional power to run the microcontroller 142 and send more complex commands is not needed through cable 124. Thus, in some embodiments, power transmitted along cable 124 from base 120 to lighting unit 130 is less than power transmitted along cable 122 from an adjacent upstream base 120 to that particular base 120. The power transmitted along cable 124 from base 120 to lighting unit 130 may also be less than power transmitted along cable 126 from that particular base 120 to an adjacent downstream base 120. Because less power is being transmitted along the cables 124 connecting a base 120 with a lighting unit 130 to provide power to the lighting unit 130, the total distance of cables 108 along which full power is being transmitted is shorter, thus improving the power supply to lighting units 130 farther away from the power source (e.g., control unit 104).

Because less power is being transmitted along cable 124, cable 124 may be different than cables 122 and 126 such that cables 124 are not interchangeable with cables 122 and 126, as discussed above for cable 107 with respect to cables 103 and 105. For example, cable 124 may have a smaller diameter and/or contain fewer wires. In some embodiments, cable 124 may have a larger diameter and/or be stiffer than cables 122 and 126. However, in other embodiments, cable 124 is interchangeable with cables 122 and 126 (e.g., same diameter, same number of wires, same stiffness) to have greater modularity and simplify the setup of system 100. Having different lengths does not make the cables non-interchangeable.

As mentioned above, lighting system 100 may be used to space lights from the ceiling or the ground. For example, base 120 may be coupled to a ceiling and lighting unit 130 be spaced from the ceiling, hanging from base 120 via cable 108. In some embodiments, base 120 may be coupled to a ceiling via bolts, screws, or other fasteners. In some embodiments, base 120 may be coupled to a ceiling via adhesives. Base 120 may be coupled to a ceiling via other fastening means (e.g., hook and loop fasteners, etc.). Base 120 may be coupled to a ceiling via a combination of the disclosed techniques, or any other technique. In some embodiments, base 120 itself may include a component configured to couple to the ceiling (e.g., a protruding component configured to pierce a ceiling, etc.).

In some embodiments, base 120 may instead be coupled to a ground with any of the techniques described above, or others. In some embodiments, cable 124 may be stiff enough that it can support lighting unit 130 to be spaced from the ground. In some embodiments, cable 124 is stiffer than cables 122 and 124 such that they are not interchangeable. Thus, lighting unit 130 may be disposed above base 120 and third cable connector 125 may be disposed on a top of base 120 (e.g., the portion of the base disposed farthest from the ground or floor and closest to the ceiling).

Figure 4:
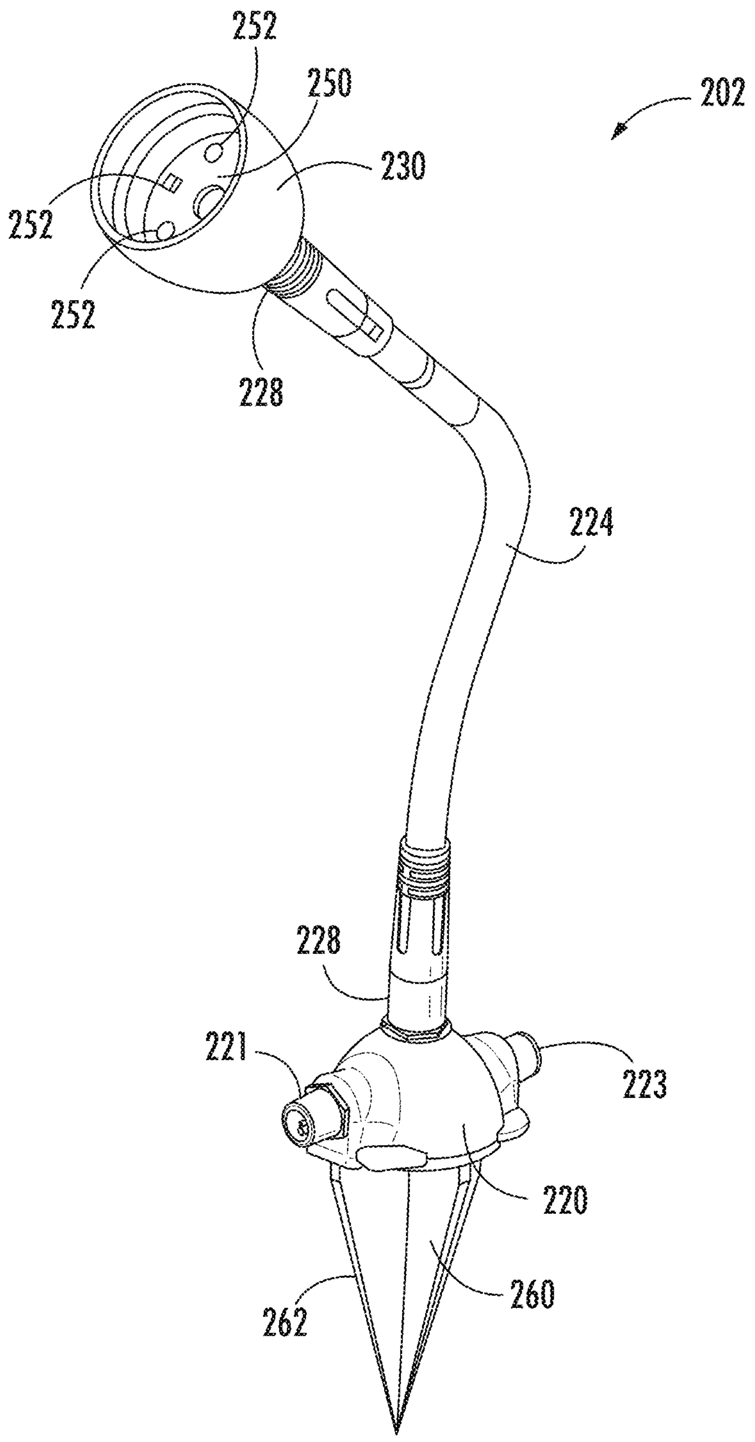
FIG. 4 is a perspective view of a base, a cable, and a lighting unit that may be used in a modular lighting system according to some embodiments.
Figure 5:
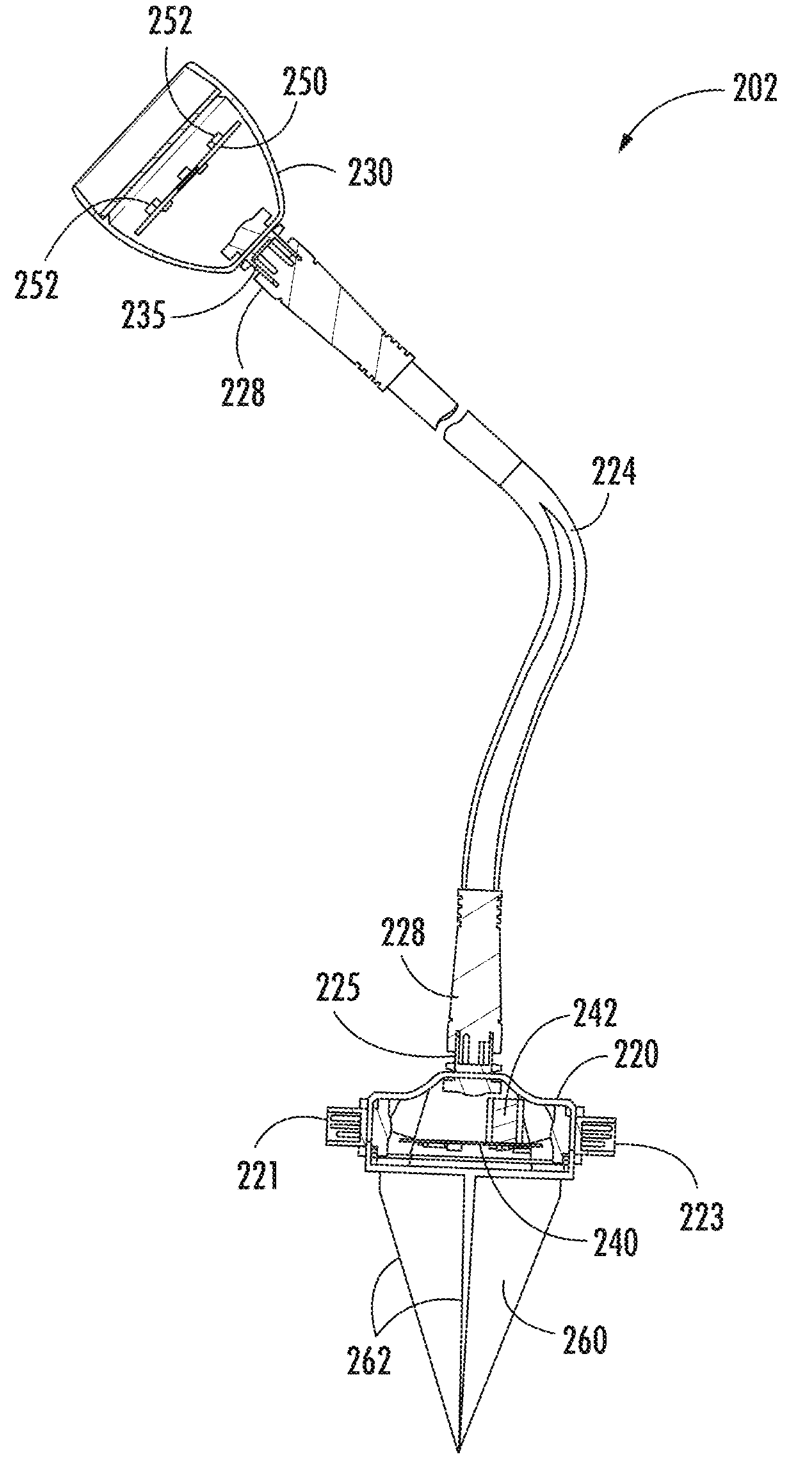
FIG. 5 is a cross-section view of the base, cable, and lighting unit of FIG. 4 according to some embodiments.

Another spaced lighting arrangement 202 for being spaced from the ground is shown, for example, in FIGS. 4 and 5. A plurality of spaced lighting arrangements 202 (e.g., arranged in series) may be used in place of spaced lighting arrangements 102 shown in FIG. 1. In some embodiments, a combination of spaced lighting arrangements 102 and spaced lighting arrangements 202 may be used in a single system 100. Thus, lighting units may be installed to be spaced from the ceiling and other lighting units may be installed to be spaced from the ground in the same system 100. This concept illustrates the complete modularity of system 100.

Spaced lighting arrangement 202 may comprise a base 220, a lighting unit 230, and a cable 224 connecting lighting unit 230 and base 220. In some embodiments, base 220 comprises three cable connectors, including a first cable connector 221, a second cable connector 223, and a third cable connector 225. Each cable connector 221, 223, 225 is configured to connect to a cable 108, such as cable 224. For example, cable connectors 221, 223, 225 may be threaded or have some other mating feature corresponding to an end of cables 108. Cable connectors 221, 223, 225 may have any of the features of the cable connectors disclosed in U.S. application Ser. No. 16/929,668, filed Jul. 15, 2020, U.S. application Ser. No. 17/728,851, filed Apr. 25, 2022, and U.S. application Ser. No. 17/867,626, filed Jul. 18, 2022.

In some embodiments, a first cable (such as cable 122 or a similar cable) is connected to first cable connector 221 (see FIG. 1 for the cable 122 and FIGS. 4 and 5 for the cable connector 221). First cable 122 may connect base 220 to a first adjacent base 220 disposed upstream in a series of bases 220. In some embodiments, a second cable (such as cable 126 or a similar cable) is connected to second cable connector 223 (see FIG. 1 for the cable 126 and FIGS. 4 and 5 for the cable connector 223). Second cable 126 may connect base 220 to a second adjacent base 220 disposed downstream in a series of bases 220. In some embodiments, a third cable 224 is connected to third cable connector 225 (see FIGS. 4-5). Third cable 224 may connect base 220 to lighting unit 230. In some embodiments, cables 122, 224, 126 are interchangeable such that they are configured to connect to any of first cable connector 221, second cable connector 223, and third cable connector 225. In some embodiments, cable 224 may be stiffer than cables 122 and 126. Thus, in some embodiments, cable 224 may not be interchangeable with cables 122 or 126, as discussed above with respect to cable 107 and cables 103 and 105.

In some embodiments, first cable connector 221 and second cable connector 223 are disposed on opposite sides of base 220 from each other, as shown in FIGS. 4 and 5. First cable connector 221 and second cable connector 223 may be aligned with each other such that they share a common axis. In other embodiments, first cable connector 221 and second cable connector 223 are disposed at angles with respect to each other. For example, first cable connector 221 and second cable connector 223 may be disposed at right angles to each other (i.e., 90-degree angles), which may facilitate a change in direction for a string of spaced lighting arrangements 202. In some embodiments, base 220 may have additional cable connectors, allowing a user to select which cable connector to use when assembling system 100.

In some embodiments, third cable connector 225 is disposed at a right angle (i.e., 90-degree angle) with respect to first cable connector 221 and second cable connector 223. First cable connector 221, second cable connector 223, and third cable connector 225 may have their axes in a single plane. In some embodiments, third cable connector 225 is disposed on a top of the base 220 (e.g., the portion of the base disposed farthest from the ground or floor and closest to the ceiling), as shown in FIGS. 4 and 5. Lighting unit 230 may be disposed above base 220. With the first cable connector 221, second cable connector 223, and third cable connector 225 arranged as shown in FIGS. 4 and 5, base 220 may be a T-shaped connection (e.g., an inverted T-shaped connection) between cables 122, 224, 126.

In some embodiments, cable 224 that connects lighting unit 230 to base 220 (via third cable connector 225) comprises two ends 228. One end 228 is connected to third cable connector 225 and the other end 228 is connected to a cable connector 235 (see FIG. 5) of lighting unit 230. Ends 228 may be the same, allowing cable 224 to be installed in either direction, furthering the modular nature of system 100. Ends 228 may include threads or some other mating feature to correspond with cable connectors 225 and 235 (and other cable connectors of system 100). To facilitate this, cable connectors 221, 223, 225, 235 may each have the same shape and size. A gap is shown in cable 224 to represent that cables 224 of different lengths may be used as the cable 224 that connects a base 220 and a lighting unit 230.

As shown in FIG. 5, base 220 may comprise a base circuit board 240. In some embodiments, base circuit board 240 is disposed within base 220 (e.g., within a housing of base 220). Base 220 may provide electrical connections between cable connectors 221, 223, 225 and base circuit board 240 so that power and communications from control unit 104 will reach base circuit board 240 and be able to be transmitted on to either lighting unit 230 or the next base 220. In some embodiments, a microcontroller 242 is mounted on base circuit board 240.

As also shown in FIG. 5, lighting unit 230 may comprise a lighting unit circuit board 250. In some embodiments, lighting unit circuit board 250 is disposed within lighting unit 230 (e.g., within a housing of lighting unit 230). Lighting unit 230 may provide electrical connections between cable connector 235 and lighting unit circuit board 250 so that power will reach lighting unit circuit board 250. In some embodiments, one or more light emitting diodes 252 are mounted on lighting unit circuit board 250.

Microcontroller 242 may be configured to control light emitting diodes 252. For example, microcontroller 242 may receive communication from control unit 104 and, based on that communication, light up light emitting diodes 252 so that lighting unit 230 emits light according to the communication from control unit 104. By placing microcontroller 242 in base 220 (rather than in lighting unit 230), less power can be transmitted along cable 224 than is transmitted along cables 122, 126. For example, power to light up the light emitting diodes 252 is all that is needed. Additional power to run the microcontroller 242 and send more complex commands is not needed through cable 224. Thus, in some embodiments, power transmitted along cable 224 from base 220 to lighting unit 230 is less than power transmitted along cable 122 from an adjacent upstream base 220 to that particular base 220. The power transmitted along cable 224 from base 220 to lighting unit 230 may also be less than power transmitted along cable 126 from that particular base 220 to an adjacent downstream base 220. Because less power is being transmitted along the cables 224 connecting a base 220 with a lighting unit 230 to provide power to the lighting unit 230, the total distance of cables 108 along which full power is being transmitted is shorter, thus improving the power supply to lighting units 230 farther away from the power source (e.g., control unit 104).

Because less power is being transmitted along cable 224, cable 224 may be different than cables 122 and 126 such that cables 224 are not interchangeable with cables 122 and 126, as discussed above for cable 107 with respect to cables 103 and 105. For example, cable 224 may have a smaller diameter and/or contain fewer wires. In some embodiments, cable 224 may have a larger diameter and/or be stiffer than cables 122 and 126. However, in other embodiments, cable 224 is interchangeable with cables 122 and 126 (e.g., same diameter, same number of wires, same stiffness) to have greater modularity and simplify the setup of system 100. Having different lengths does not make the cables non-interchangeable.

As mentioned above, lighting system 100 may be used to space lights from the ceiling or the ground. For example, base 220 may be coupled to the ground with lighting unit 230 spaced from the ground (e.g., supported by a stiffness of cable 224). In some embodiments, cable 124 is stiffer than cables 122 and 124 such that they are not interchangeable. In some embodiments, base 220 may be coupled to the ground via bolts, screws, or other fasteners. In some embodiments, base 220 may be coupled to the ground via adhesives. Base 220 may be coupled to the ground via other fastening means (e.g., hook and loop fasteners, etc.). Base 220 may be coupled to the ground via a combination of the disclosed techniques, or any other technique. In some embodiments, base 220 itself may include a component configured to couple to the ground. For example, as shown in FIGS. 4 and 5, base 220 comprises a protruding structure 260. Protruding structure 260 may be configured to extend into the ground to hold base 220 in place. In some embodiments, protruding structure 260 comprises one or more fins 262 to facilitate insertion into the ground. For example, protruding structure 260 may comprise four fins 262 at right angles with respect to each other, forming a "cross" shape. In some embodiments, fins 262 are larger near the rest of base 220 and gradually get smaller moving away from base 220 until they reach a point, allowing for easier insertion into the ground.

In some embodiments, base 220 may instead be coupled to a ceiling with any of the techniques described above, or others. Thus, lighting unit 230 may be disposed below base 220 and third cable connector 225 may be disposed on a bottom of base 220 (e.g., the portion of the base disposed closest to the ground or floor and farthest from the ceiling).

Where the above examples, embodiments and implementations reference examples, it should be understood by those of ordinary skill in the art that other modular lighting systems and lighting units could be intermixed or substituted with those provided. In places where the description above refers to particular embodiments of systems and methods of modular lighting, it should be readily apparent that a number of modifications may be made without departing from the spirit thereof and that these embodiments and implementations may be applied to other lighting technologies as well.

Accordingly, the disclosed subject matter is intended to embrace all such alterations, modifications and variations that fall within the spirit and scope of the disclosure and the knowledge of one of ordinary skill in the art.

What is claimed is:

1. A modular lighting system comprising:

a lighting unit comprising a lighting unit circuit board and one or more light emitting diodes mounted on the lighting unit circuit board;

a base comprising three cable connectors, a base circuit board, and a microcontroller mounted on the base circuit board;

a first cable connected to a first cable connector of the three cable connectors and connecting the base to a first adjacent base in a series of bases, the first adjacent base disposed upstream from the base;

a second cable connected to a second cable connector of the three cable connectors and connecting the base to a second adjacent base in the series of bases, the second adjacent base disposed downstream from the base; and a third cable connected to a third cable connector of the three cable connectors and connecting the base to the lighting unit;

wherein the first cable, the second cable, and the third cable are interchangeable such that the first cable, the second cable, and the third cable are configured to connect to any of the first cable connector, the second cable connector, and the third cable connector and configured to connect to any of the lighting unit, the first adjacent base, and the second adjacent base.

2. The modular lighting system of claim 1, wherein the base is configured to connect to a ceiling.

3. The modular lighting system of claim 2, wherein the lighting unit is disposed below and hanging from the base.

4. A modular lighting system comprising:

a control unit;

a plurality of bases arranged in series, wherein each base of the plurality of bases is configured to connect to a ceiling, and wherein a first base of the plurality of bases is connected to the control unit;

a plurality of lighting units, each lighting unit connected to one of the plurality of bases; and a plurality of cables comprising a first cable connecting the control unit and the first base of the plurality of bases, a set of base cables, wherein each base cable connects two bases of the plurality of bases, and a set of lighting unit cables, wherein each lighting unit cable connects one of the plurality of lighting units to one of the plurality of bases such that each lighting unit is disposed below and hanging from one of the plurality of bases;

wherein an amount of power transmitted along the lighting unit cables is less than an amount of power transmitted along the first cable and the base cables.

5. The modular lighting system of claim 4, wherein the first cable, the base cables, and the lighting unit cables are interchangeable such that each of the first cable, the base cables, and the lighting unit cables is configured to connect to the control unit, any base of the plurality of bases, and any lighting unit of the plurality of lighting units.

6. The modular lighting system of claim 4, wherein the first cable and the base cables are interchangeable.

7. The modular lighting system of claim 4, wherein the lighting unit cables are different than the first cable and the base cables such that the lighting unit cables are not interchangeable with the first cable or the base cables.

8. The modular lighting system of claim 7, wherein the lighting unit cables are stiffer than the first cable and the base cables.

9. The modular lighting system of claim 7, wherein a diameter of the lighting unit cables is different than a diameter of the first cable and a diameter of the base cables.

10. The modular lighting system of claim 9, wherein the diameter of the lighting unit cables is less than the diameter of the first cable and the diameter of the base cables.

11. The modular lighting system of claim 4, wherein each base comprises a base circuit board and a microcontroller mounted on the base circuit board, and wherein each lighting unit comprises a lighting unit circuit board and one or more light emitting diodes mounted on the lighting unit circuit board.

* * * * *